(12) United States Patent
Kisner et al.

(10) Patent No.: US 7,745,765 B2
(45) Date of Patent: Jun. 29, 2010

(54) THERMAL AND HIGH MAGNETIC FIELD TREATMENT OF MATERIALS AND ASSOCIATED APPARATUS

(75) Inventors: Roger A. Kisner, Knoxville, TN (US); John B. Wilgen, Oak Ridge, TN (US); Gerard M. Ludtka, Oak Ridge, TN (US); Roger A. Jaramillo, Knoxville, TN (US); Gail Mackiewicz-Ludtka, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 326 days.

(21) Appl. No.: 11/480,683

(22) Filed: Jul. 3, 2006

(65) Prior Publication Data
US 2006/0289491 A1  Dec. 28, 2006

Related U.S. Application Data

(62) Division of application No. 11/109,376, filed on Apr. 19, 2005, now Pat. No. 7,161,124.

(51) Int. Cl.
*H05B 6/02* (2006.01)
*H05B 6/10* (2006.01)

(52) U.S. Cl. ........................ 219/635; 219/600

(58) Field of Classification Search ................. 219/635, 219/636, 637, 638, 639, 640, 641, 642, 643, 219/644, 645, 646, 600
See application file for complete search history.

(56) References Cited

U.S. PATENT DOCUMENTS

| 4,554,029 | A | * | 11/1985 | Schoen et al. | ............... 148/112 |
| 4,798,926 | A | * | 1/1989 | Sakai | ......................... 219/634 |
| 6,773,513 | B2 | | 8/2004 | Ludtka | |
| 7,079,801 | B2 | * | 7/2006 | Nakayama | ................... 399/330 |
| 7,161,124 | B2 | * | 1/2007 | Kisner et al. | ................ 219/635 |
| 2006/0231549 | A1 | * | 10/2006 | Kisner et al. | ................ 219/635 |
| 2006/0289491 | A1 | * | 12/2006 | Kisner et al. | ................ 219/635 |

OTHER PUBLICATIONS

G.M.Ludtka "In situ evidence of enhanced transformation kinetics in medium carbon steel due to a high magnetic field" Scripta Materialia 51 (Apr. 20, 2004) pp. 171-174.

* cited by examiner

*Primary Examiner*—Daniel L Robinson
(74) *Attorney, Agent, or Firm*—Brinks Hofer Gilson & Lione

(57) ABSTRACT

An apparatus and method for altering characteristics, such as can include structural, magnetic, electrical, optical or acoustical characteristics, of an electrically-conductive workpiece utilizes a magnetic field within which the workpiece is positionable and schemes for thermally treating the workpiece by heating or cooling techniques in conjunction with the generated magnetic field so that the characteristics of the workpiece are effected by both the generated magnetic field and the thermal treatment of the workpiece.

20 Claims, 4 Drawing Sheets

THERMAL AND HIGH MAGNETIC FIELD TREATMENT OF MATERIALS AND ASSOCIATED APPARATUS

This is a divisional application of application Ser. No. 11/109,376, filed Apr. 19, 2005 now U.S. Pat. No. 7,161,124.

This invention was made with Government support under Contract No. DE-AC05-00OR22725 awarded by the U.S. Department of Energy to UT-Battelle, LLC, and the Government has certain rights to the invention.

BACKGROUND OF THE INVENTION

This invention relates generally to the treatment of material for altering characteristics of the material and relates, more particularly, to the means and methods for treating such materials.

The material-treatment processes with which this invention is to be compared include those which are carried out for the purpose of altering and thereby improving characteristics (such as can include structural, magnetic, electrical, optical or acoustical characteristics) of the material being treated. Such processes (e.g. annealing processes) can involve the treatment of materials at temperatures which are less than the melting temperature of the material being treated so that characteristics, such as the strength, durability or hardness, of the material are advantageously affected by the treatment.

It is an object of the present invention to provide a new and improved apparatus and method for treating materials to alter characteristics of the material.

Another object of the present invention is to provide such an apparatus and method which can be used to achieve properties in a material which have not heretofore been obtainable.

Still another object of the present invention is to provide such an apparatus and method which can employ thermal treatment of the material, yet require less input energy than do many conventional thermal treatment processes.

Yet another object of the present invention is to provide such an apparatus and method which can be efficiently utilized to process materials over a relatively broad range of material applications.

A further object of the present invention is to provide such an apparatus and method whose principles can be used in commercial applications which might require large quantities of materials whose characteristics are desired to be altered.

A still further object of the present invention is to provide such an apparatus which is uncomplicated in structure, yet effective in operation.

SUMMARY OF THE INVENTION

This invention resides in an apparatus and method for altering characteristics of a workpiece which includes an electrically-conductive material.

The apparatus of the invention includes means for generating a magnetic field within which a workpiece whose characteristics are desired to be altered is positionable. In addition, the apparatus includes means associated with the magnetic field-generating means for thermally treating the workpiece in conjunction with the generated magnetic field so that the characteristics of the workpiece are effected by both the generated magnetic field and the thermal treatment. The means for thermally treating the workpiece can include means for heat-treating the workpiece, means for cooling the workpiece or both heat-treating means and cooling means.

The process of the invention includes the steps which are carried out with the apparatus of the invention. In particular, the process includes a step of exposing the workpiece to a magnetic field and thermally treating the workpiece in conjunction with the exposure of the workpiece to the magnetic field so that the characteristics of the workpiece are effected by both the magnetic field and the thermal treatment. Depending upon the desired characteristics of a workpiece to be treated with this process, the thermal treatment step can involve heating the workpiece or cooling the workpiece or both heating and cooling the workpiece in preselected sequences, and such heating and/or cooling of the workpiece can be carried out before, during or after the exposure of the workpiece to the magnetic field.

DETAILED DESCRIPTION OF THE ILLUSTRATED EMBODIMENTS

Within the illustrated drawings discussed herein, there are illustrated various examples of apparatus, or systems, with which a workpiece can be worked upon, or treated, so that characteristics (such as can include the structural, magnetic, electrical, optical or acoustical characteristics) of the workpiece are altered. As will be apparent, each of the exemplary apparatus described herein involves the exposure of a workpiece to a magnetic field and to an associated thermal treatment so that the characteristics of the workpiece are effected (i.e. altered) by both the magnetic field and the thermal treatment to which the workpiece is exposed.

It will be understood, however, that in the interests of the present invention, as long as the thermal treatment (e.g. cooling or heating of the workpiece or both) are carried out in the same process involving the exposure of the workpiece to a magnetic field, it does not matter whether the thermal treatment of the workpiece and the exposure of the workpiece to a magnetic field occurs simultaneously. For example, in order to provide a workpiece with advantageous properties or qualities (e.g. as may relate to strength, durability or hardness of the workpiece), it may be desirable to initially raise the temperature of the workpiece to an elevated level, then expose the workpiece to a magnetic field, and subsequently remove the workpiece from the magnetic field and rapidly cool the workpiece to room temperature. Alternative treatment processes may involve a repetition of heating and cooling cycles while the workpiece is advanced into, through, and then out of a magnetic field. Accordingly, the principles of the present invention can be variously applied.

Figure 1:
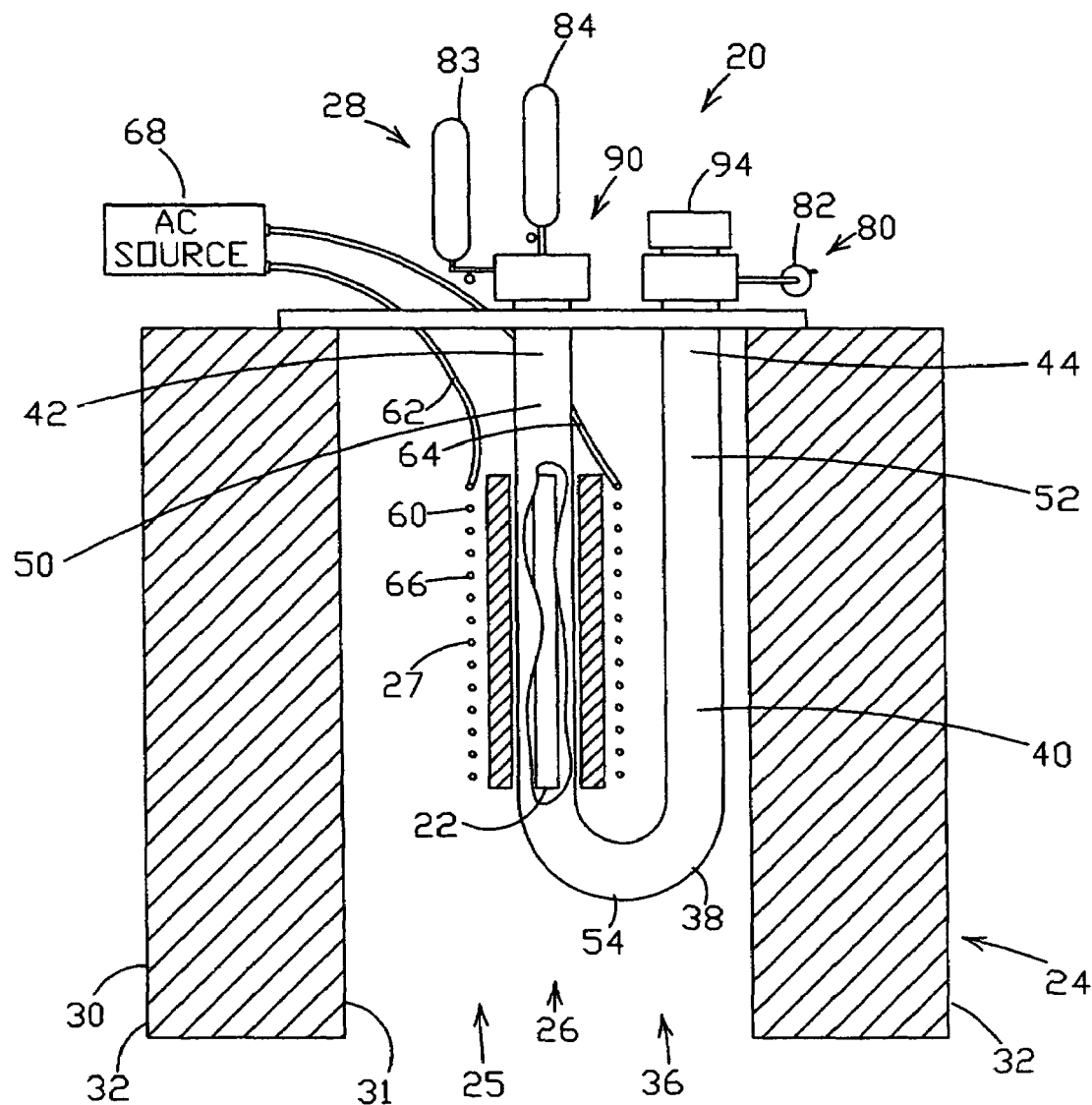
FIG. 1 is a schematic side elevation view, shown partially cut-away, of an embodiment of an apparatus with which a process of the present invention can be carried out.

Considering first FIG. 1, there is illustrated an embodiment of an apparatus, generally indicated 20, within which a workpiece 22 can be worked upon, or treated, to alter the characteristics of the workpiece 22. In this connection, the apparatus 20 includes means, generally indicated 24, for generating an ultrahigh magnetic field within which the workpiece 22 is positionable, means, generally indicated 25, for thermally treating the workpiece 22 in conjunction with the exposure of the workpiece 22 to the generated magnetic field. More specifically, the thermal treatment means 25 includes means, generally indicated 26, for heating (i.e. heat-treating) the workpiece 22 and means, generally indicated 28, for cooling the workpiece 22. Through the use of the heating means 26 and the cooling means 28, the workpiece 22 can be heated or cooled, as desired (e.g. in a preferred or controlled sequence) either prior to, during, or following the exposure of the workpiece 22 to the ultrahigh magnetic field generated by the magnetic field-generating means 24.

As suggested earlier and depending, for example, upon the desired characteristics of the workpiece 22 following treatment, heat can be applied to the workpiece 22 prior to its introduction into the generated magnetic field, while it resides within the generated magnetic field, or following its removal from the magnetic field. Along the same lines, cooling (or quench) can be applied to the workpiece 22 prior to its introduction into the generated magnetic field, while the workpiece 22 is present within the magnetic field or following its removal from the magnetic field. It therefore follows that the workpiece 22 can be heated or cooled in any of a number of different sequences depending upon the desired characteristics of the workpiece 22 following treatment.

Within the depicted FIG. 1 embodiment 20, the heating means 26 employs induction heating equipment 27 for heating the workpiece 22. Accordingly and in order for the workpiece 22, and in particular, the microstructure of the workpiece 22, to be affected by both the heating means 26 and the magnetic field generated by the magnetic field-generating means 24, the workpiece 22 which is capable of being worked upon, or treated, with the apparatus 20 must include an electrically-conductive material. In other words, in order for the microstructure of the workpiece 20 be responsive to the magnetic field generated by the magnetic field-generated means 24, the workpiece 22 must contain or be comprised of material which renders the workpiece 22 electrically-conductive.

With reference still to FIG. 1, the magnetic field-generating means 24 includes a magnet 30 which is in the form of a solenoid magnet 30 having a core 31 and illustrated cross-sectional portions 32. It is within the core 31 (and inside the portions 32) that a desired high magnetic field is generated. The magnet 30 can take the form of either a resistive magnet, a permanent magnet, or a superconductor (e.g. cryogenic or a high temperature superconductor) magnet capable of achieving relatively high levels of magnetic field strength. In addition, a hybrid magnet which utilizes a combination of the aforementioned magnet classes (e.g. resistive, permanent and superconductor) can be employed. In the interests of the present invention, the terms "high" and "ultrahigh" used herein in conjunction with the strength of the magnetic field strength generated by the magnet 30 for purposes of treating the workpiece 22 is at least as high as about one Tesla. In practice and depending upon the form of the magnet 30, the magnet 30 may be capable of generating a field strength as high as several tens of Tesla.

Depending upon the desired magnetic field treatment of the workpiece 22 while positioned within the apparatus 20, the generated magnetic field may remain ON (i.e. operate continuously) for as long as the workpiece 22 is exposed to the magnetic field or be ramped up as the workpiece 22 is advanced into the magnetic field. Therefore, the operation of the magnetic field-generating means 24 is preferably controllable in this respect.

The cooling means 28 of the apparatus 20 includes means, generally indicated 36, for defining a passageway 38 within which the workpiece 22 is positioned while the workpiece 22 is being worked upon within the apparatus 20. Within the depicted apparatus 20, the passageway-defining means 36 is in the form of an insulated guide tube 40 having an entrance end 42, an exit end 44 and an interior which extends between the entrance and exit ends 42 and 44 and which provides the passageway 38 of the passageway-defining means 36. The guide tube 40 can be constructed of any of a number of non-magnetic materials, such as ceramic or quartz, which are incapable of being affected by the magnetic field generated by the magnetic field-generating means 24 and which is capable of holding a vacuum which is desired to be drawn within the tube 40 for reasons which will be apparent herein.

The guide tube 40 of the depicted apparatus 20 is U-shaped in form having two legs 50, 52 and an arcuate section 54 joining the legs 50, 52. With the tube 30 shaped in such a manner, the entrance and exit ends 42 and 44 open out of the same side of the magnet 30. It will be understood, however, that the tube 40 can possess any of a number of alternative shapes, such as that of a straight tube, in accordance with the broader aspects of this invention. Moreover and is suggested hereinafter, the guide tube 30 need not be non-magnetic for some treatment processes.

As mentioned earlier, the heating means 26 of the apparatus 20 utilizes induction heating equipment 27 for purposes of heat-treating the workpiece 22. In this connection, the induction heating equipment 27 includes a length of a copper tube 60 having two end sections 62 and 64 and a coiled section 66 which is disposed between the two end sections 62 and 64 and which is positioned about one leg 52 of the U-shaped guide tube 40. While copper is well-suited as the material of the tube 40 because of its thermal and electrically-conductive properties, other materials (such as aluminum or stainless steel) could be used. For purposes of heating the workpiece 22 by the induction heating equipment 27, the workpiece 22 is positioned within the leg 52 of the guide tube 40 so that the workpiece 22 is disposed within the interior of the coil section 66.

In addition, the end sections 62 and 64 of the copper tube 60 are connected between the leads of an alternating current (AC) power source 68 for directing an alternating current through the coil section 66 for purposes of heating the workpiece 22 as the workpiece 22 is positioned within the leg 50 of the guide tube 40. The operating principles of an induction heating coil are well known so that a detailed description of such principles is not believed to be necessary. Suffice it to say that by directing an alternating current through the coil 66 (i.e. between the tube end sections 62 and 64), a varying magnetic field is created within the coil 66 which, in turn, induces electromotive forces in the workpiece 22. As a result of the created electromotive forces, eddy currents are produced within the workpiece 22, and because the workpiece 22 has an internal resistance to current flow, heat is generated within the workpiece 22 thereby effecting a rise in the temperature of the workpiece 22.

Although the coil section 66 of the copper tube 60 is shown and described herein as being formed in a solenoid configuration, the copper tube can possess an alternative configuration, such as a poloidal configuration.

As an alternative to heating the workpiece 22 directly, a susceptor (not shown) could be positioned about the workpiece 22 (e.g. in heat exchange relationship therewith) so that the heating means 26 heats the susceptor which, in turn, heats the workpiece. The materials out of which such a susceptor can be constructed can include paramagnetic materials, non-ferromagnetic materials, or even ferromagnetic material. Further still, an alternative guide tube for the FIG. 1 apparatus 20 could be positioned outside of, rather than inside, the coil section 66 of the heating means 26.

The apparatus 20 also includes means, generally indicated 80, for drawing a vacuum within the guide tube passageway 38. In this connection, the vacuum-drawing means 80 includes a vacuum pump 82 whose inlet is appropriately connected to the tube passageway 38 so that operation of the vacuum pump 82 evacuates the interior of the passageway 38 of atmospheric gas (i.e. air). In the depicted apparatus 20, the inlet of the vacuum pump 72 communicates with the interior of the passageway 38 at a location adjacent the end of the leg 52 of the U-shaped guide tube 40. During operation of the apparatus 20, a vacuum is drawn within the guide tube passageway 38 after the workpiece 22 is positioned within the passageway 38. By evacuating the passageway 38 of air at the outset of a treatment process performed with the apparatus 20, the likelihood that the surface of the workpiece 22 will oxidize during the treatment process is significantly reduced. In other words, by evacuating the passageway 38 of air at the outset of a treatment process performed upon the workpiece 22, the workpiece 22 is less likely to experience corrosion during its treatment with the apparatus 20.

With reference still to FIG. 1, the cooling means 28 of the apparatus 20 includes means, generally indicated 90, for directing a cooling fluid (e.g. purge or quench gas) into the passageway 38 where it is permitted to come into contact with the workpiece 22. In this connection, there is provided a source 83 of compressed purge gas, such as Argon, which is connected to the passageway 38 by way of an appropriate conduit so that, when cooling of the workpiece 22 is desired, the purge gas can be directed into the passageway 38 where it is exposed to the workpiece 22 positioned therein for withdrawing heat therefrom. Furthermore, there is provided a source 84 of compressed quench gas, such as helium, which is connected to the passageway 38 by way of an appropriate conduit so that when quenching (i.e. relatively rapid cooling) of the workpiece 22 is desired, the quench gas can be directed into the passageway 38 where it is permitted to come into contact with the workpiece 22 for withdrawing heat therefrom.

During operation of the apparatus 20, the temperatures of the quench and purge gases introduced into the passageway 38 can be controlled by controlling the internal pressure of the gases contained within the passageway 38. To aid in the control of passageway pressure, there is provided a pop-off valve 94 which is mounted upon the end of the leg 52 of the U-shaped guide tube 40 which permits an amount of quench or purge gas to escape from the tube passageway 38, as necessary, to maintain the internal pressure of the tube passageway 38 below a preselected pressure.

It follows that within the apparatus 20, the workpiece 22 can be heated or cooled, as desired, in conjunction with the magnetic field generated within the core 31 of the magnet 30. For example, after positioning the workpiece 22 within the leg 50 of the guide tube 40 and evacuating the tube 40 of atmospheric gas, the temperature of the workpiece 22 can be ramped up to a desired level through, for example, a sequence of temperatures with appropriate hold times at each temperature. The argon gas can be used to accelerate radiation cooling as desired so that the rate of the temperature being ramped is controlled. Similarly, the strength of the magnetic field generated with the magnet 30 and to which the workpiece 22 is exposed can be ramped to a desired level and maintained thereat for a desired duration. Finally, the workpiece 22 can be quenched by a high volume of helium, and then the magnetic field is ramped to a lower level. It will be understood that the treatment schemes of the workpiece 22 with heat (from the heating means 26), cooling (from the cooling means 28) and magnetic field (from the magnetic field-generating means 24) of the apparatus 20 can be varied in any of a number of ways.

Figure 2:
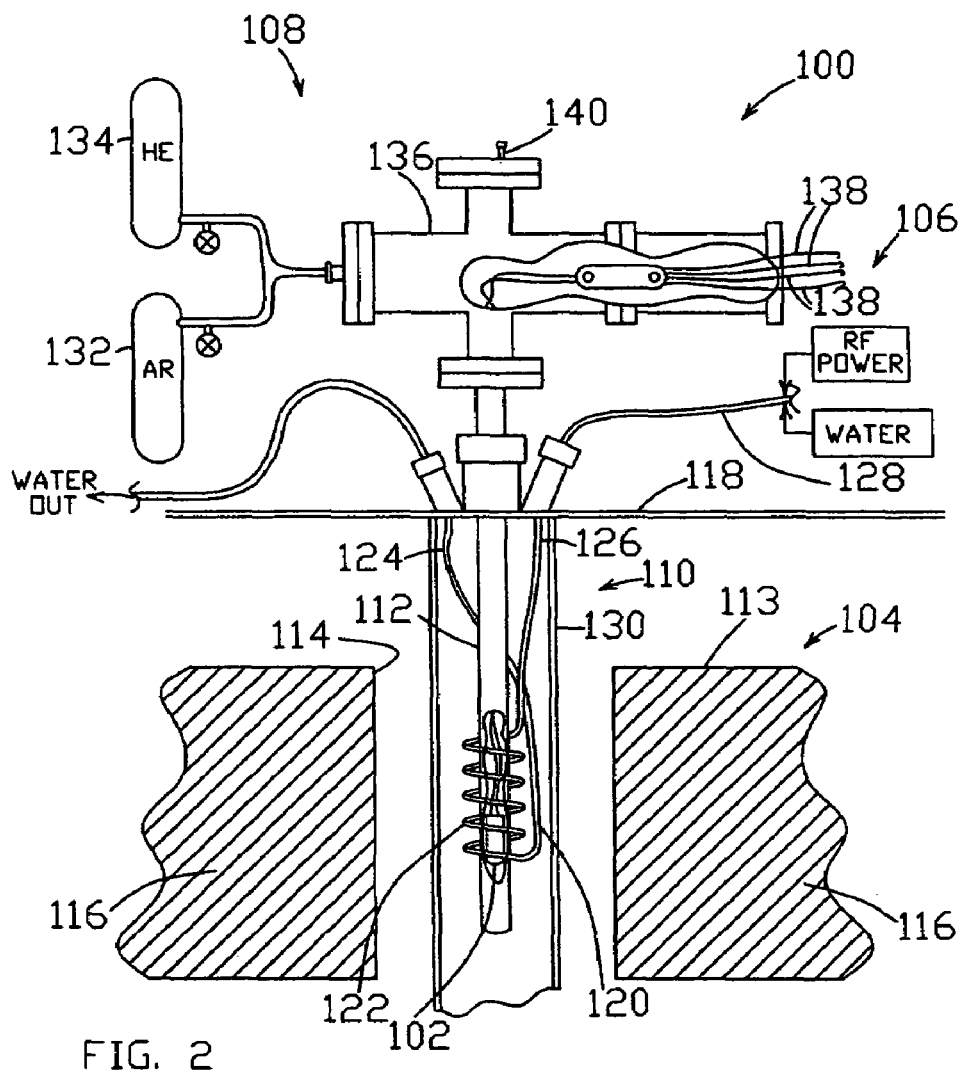
FIG. 2 is a schematic side elevation view, shown partially cut-away, of another embodiment of an apparatus with which a process of the present invention can be carried out.

With reference to FIG. 2, there is illustrated an alternative embodiment of an apparatus, generally indicated 100, with which a workpiece 102 can be treated in accordance with the steps of the present invention. The apparatus 100 includes means, indicated 104, for generating a magnetic field within which the workpiece 102 is positionable and heating means 106 (i.e. induction heating means) for heating the workpiece 102. In addition, there is provided workpiece cooling means, generally indicated 108, which includes a passageway-defining means 110 providing a passageway 112 within which the workpiece 102 is positioned as it is worked upon by the apparatus 100.

Within the depicted apparatus 100, the magnetic field-generating means 104 includes a solenoid magnet 113 having a core 114 which is defined inside of the illustrated cross-sectional portions 116 of the magnet 113. The magnet 113 is capable of generating an ultrahigh magnetic field within its core 113, and it is within the core 113 that the workpiece 102 is positionable. The passageway 112 is oriented substantially vertically and is supported substantially centrally within the core 114 of the magnet 113 by way of a horizontally-oriented mounting plate 118, and the induction heating means 106 includes a copper tube 120 having a coil section 122 which encircles a section of the passageway 112 disposed within the core of the magnet 113 and end sections 124 and 126 which are connected to an AC power source by way of coaxial RF power cable 128 having an internal conduit through which cooling water can be routed through the copper tube 120. During operation of the induction heating means 106, cooling water is directed into the copper tube 120 by way of the tube end section 124, and the cooling water exits the tube 120 by way of the tube end section 126. Positioned about so as to encircle both the coil section 122 of the induction heating means 106 and the passageway 112 is a protective copper magnet insert tube 130.

Although the depicted magnet 113 of the FIG. 2 embodiment 100 is a solenoid magnet having an annular core 114, magnet cores possessing other configurations can be employed. For example, an alternative magnet can possess an oval or irregularly-shaped bore or have a bore provided with an open end which permits, for example, the passage therethrough of a workpiece which is in the form of a sheet.

For purposes of cooling the workpiece 102, the interior of the passageway 112 is connected in flow communication with a source 132 of argon purge gas and a source 134 of helium quench gas by way of a four port chamber assembly 136 which is supported above the mounting plate 118. Purge and quench gases which are directed through the passageway 112 by way of the upper end of the passageway 112 are permitted to flow into contact and around the workpiece 102 to absorb heat from the workpiece 102 by the convective transfer of workpiece heat to the gases. The gases are thereafter permitted to flow out of the passageway 112 through the lower (open) end thereof. In addition, a plurality of thermocouples are positioned in contact with the workpiece 102 and are connected wired to a plurality of connecting wires 138 which extend out of the chamber assembly 136 through one of the ports thereof. These workpiece-contacting thermocouples can be connected to an appropriate instrumentation (not shown) to enable the temperature of the workpiece 102 to be monitored as it is being worked upon, or thermally treated, within the apparatus 100.

To enable the position of the workpiece 102 to be adjusted along the length of the passageway 112, a quartz guide rod 140 is directed downwardly through a port of the chamber assembly 136 and is connected at its lower end (as viewed in FIG. 2) to the workpiece 102. The upper end of the guide rod 140 is, in turn, accessible to an operator so that by raising or lowering the guide rod, the workpiece 102 can be moved upwardly or downwardly along the passageway 112 by a corresponding amount. Because the position of the workpiece 102 along the passageway 112 can be altered, the workpiece 102 can be moved into or out of registry with the center of the core of the magnet 113 or into or out of the interior of the tube coil section 122 of the induction heating means 106, as desired, during a workpiece-treatment process performed with the apparatus 100.

Figure 3:
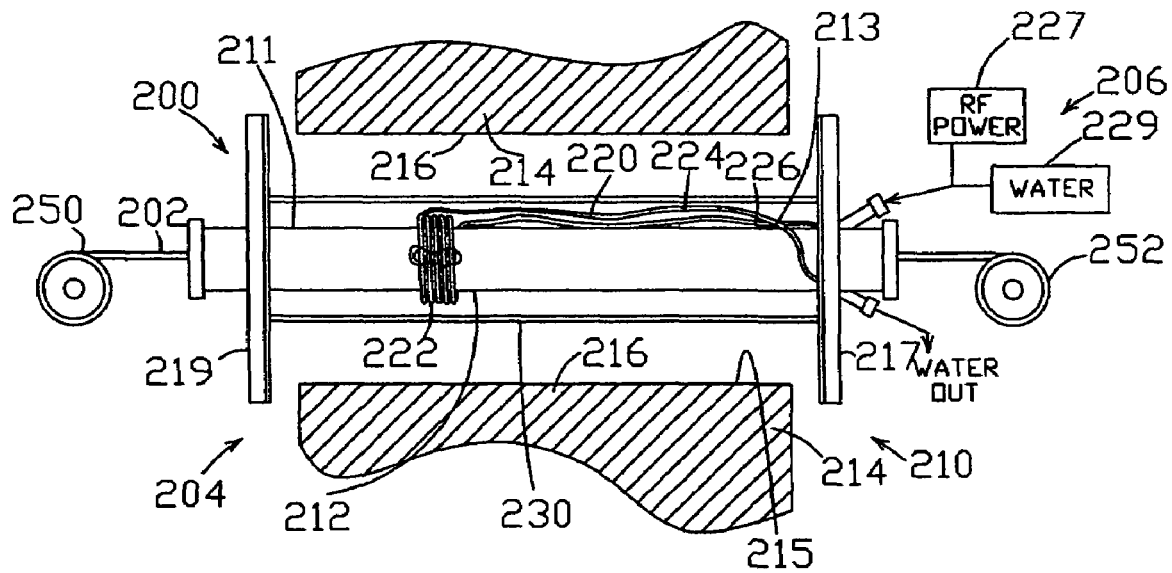
FIG. 3 is a schematic side elevation view of still another embodiment of an apparatus with which a process of the present invention can be carried out.

With reference to FIG. 3, there is illustrated an alternative embodiment of an apparatus, generally indicated 200, with which a workpiece 202 can be worked upon, or treated, in accordance with the steps of a process of the present invention. The apparatus 200 includes means, indicated 204, for generating a magnetic field through which the workpiece 202 is moved and heating means 206 (i.e. induction heating means) for heating the workpiece 202. In addition, there is included a passageway-defining means 210 providing a passageway 212 through which the workpiece 202 is advanced (e.g. between the passageway entrance end 211 and a passageway exit end 213) as it is worked upon by the apparatus 200.

Within the depicted FIG. 3 apparatus 200, the magnetic field-generating means 202 includes a magnet 214 having a core 215 provided between the illustrated cross-sectional portions 216 and which is capable of generating an ultrahigh magnetic field within the core 215. The passageway 212 is oriented horizontally and is supported substantially centrally within the magnet core 215 by way of a pair of spaced nonmagnetic mounting flanges 217, 219, and the induction heating means 206 includes a copper tube 220 having a coil section 222 which encircles a section of the passageway 212 disposed within the magnet core 215 and has end sections 224 and 226 which are connected to a source 227 of RF power. In addition, the copper tube 220 defines an internal conduit through which cooling water from a source 229 can be routed through the copper tube 220. During operation of the induction heating means 206, cooling water is directed into the copper tube 220 by way of the tube end section 224, and the cooling water exits the tube 220 by way of the tube end section 226. Positioned about so as to encircle both the coil section 222 of the induction heating means 206 and the passageway 212 is a high-frequency RF shield tube 230.

As shown in FIG. 3, the coil section 222 of the induction heating means 206 is positioned adjacent the passageway entrance end 211. It will be understood, however, that the coil section 222 can be located along the passageway 212 wherever it may be required so that a desired heating curve is generated for the workpiece 202. Furthermore, the configuration of the coil section 222 could span from the passageway entrance end 211 to the passageway exit end 213. In addition, multiple coils can be positioned about several sections of the passageway-defining means 210 to create several heating zones therealong. Further still and depending upon the size of the workpieces and the thickness of the active region of the magnetic field-generating means 204, multiple workpieces could be treated along the passageway 212 at the same time. As is the case with the apparatus 20 of FIG. 1 and the apparatus 100 of FIG. 2, quench gases, such as a combination of helium and hydrogen, can be directed into contact with selected regions of the workpiece 202 desired to be rapidly cooled.

The depicted apparatus 200 of FIG. 3 is suitable for working upon, or treating, a workpiece, or workpieces, fed either intermittently or continuously through the passageway 212. Within the illustrated FIG. 3 example, the workpiece 202 is in the form of a length of steel wire which is fed through the passageway 212 from a feed roll 250 mounted adjacent the passageway entrance end 211 and wound about a take-up roll 252 mounted adjacent the passageway exit end 213. It will be understood that as the (wire) workpiece 202 is advanced through the passageway 112, it is exposed to the generated magnetic field as it passes through the core 215 of the magnet 216 and is heated by the induction heating means as it passes through the interior of the coil section 222. Hence, the microstructure of the (wire) workpiece 202 is effected by both the generated magnetic field and the heat-treatment of the induction heating means 206. It will also be understood that the microstructure of the (wire) workpiece 202 can be altered to varying degrees by changing variables of the treatment process, such as the strength of the generated magnetic field, the strength of the current directed through the coil section 222 of the induction heating means 206 or the rate at which the wire 202 is advanced through the passageway 212.

Figure 4:
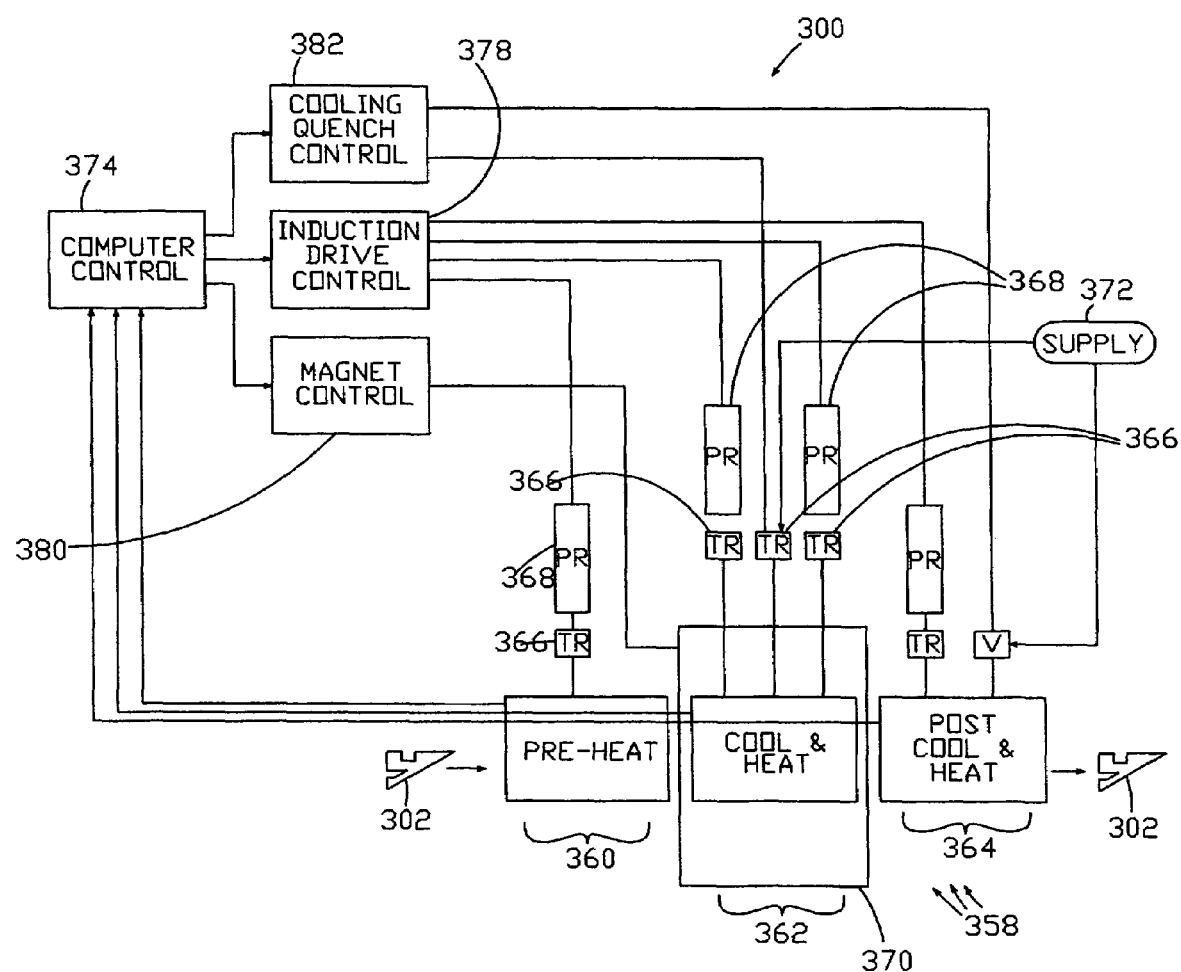
FIG. 4 is a view illustrating in block diagram form an exemplary control operation of an apparatus within which features of the apparatus of the present invention are embodied.

With reference to FIG. 4, there is schematically illustrated yet another embodiment, generally indicated 300, of an apparatus, with which a workpiece 302 can be worked upon and attending control equipment, described herein, for controlling the operation of the apparatus 300. The apparatus 300 includes a series of stations, described herein, through which the workpiece 302 is advanced as it is moved through the apparatus 300 and at which a sequence of treatment processes are carried out upon the workpiece 312. More specifically, the depicted apparatus 300 includes three such treatment stations—one station 360 of which is a preheating station (at which the workpiece 312 is pre-heated), a second station 362 at which the workpiece 312 is exposed to a magnetic field and is also heated and cooled, and a third station 366 at which the workpiece 312 is exposed to both heat-treatment and a cooling treatment.

For providing heat treatment at each of the stations 360, 362 and 364, there is provided induction heating means, generally indicated 358, including an induction heating coil (not shown) having an interior through which the workpiece 312 is advanced as it is advanced through the corresponding station 360, 362 or 362. Associated with each of the heating means 358 of the stations 360, 362 and 364 is an induction drive transformer 366 and an induction power source 368 for powering the heating coil of the corresponding heating means.

For generating a magnet field at the second station 362, the apparatus 300 includes a magnet 370 for generating a ultrahigh magnetic field at the second station 362 so that as the workpiece 302 is advanced through the second station 362, the workpiece 302 is exposed to the generated magnetic field.

To enable the workpiece 302 to be cooled or quenched at each of the second and third stations 362 and 364 gas, there is provided a source 372 of cooling gas which is connected in flow communication with the stations 362 and 364 so that when desired, the gas is directed into the corresponding station 362 or 364 for cooling the workpiece 302 moving therethrough.

For controlling the various treatment operations at the stations 360, 362 and 364, the apparatus 300 further includes a control computer 374 which can be pre-programmed to initiate the operation of the various treatments of the workpiece 302 as it moves in sequence through the stations 360, 362 and 366. In this connection, there is associated with the control computer 374 control circuitry 378 for controlling the operation of the heating means at the various stations 360, 362 and 364, control circuitry 380 for controlling the operation of the magnet 370 at the second station 362, and control circuitry 382 for controlling the delivery of the cooling gas from the supply 372 to the second and third stations 362 and 364.

During operation of the apparatus 300, when the computer 374 determines (through pre-programmed information) that the workpiece 302 should be exposed to the desired treatment (e.g. heat-treatment, cooling-treatment or magnetic field treatment) as the workpiece is advanced through the various stations 360, 362 and 364, appropriate command signals are sent from the computer 374 to the appropriate control circuitry 378, 380 or 382 so that the desired treatment is initiated at the corresponding station 360, 362 or 364. Appropriate feedback information (e.g. the temperature at various points of travel through the stations 360, 362 and 364 or of the workpiece itself) can be collected (through, for example, the use of thermocouples or radiation emission) for use by the computer 374 so that the processes performed with the apparatus 300 can be appropriately monitored.

It follows from the foregoing that an apparatus and process has been described for altering the structural characteristics of a workpiece which includes an electrically-conductive material. Such an apparatus and process involves the generation of a magnetic field within which a workpiece is positionable and the thermal treatment of the workpiece in conjunction with the generated magnetic field so that the structural characteristics of the workpiece are effected by both the generated magnetic field and the thermal treatment.

That the microstructure of workpieces can be altered by the aforedescribed apparatus and process has been verified through experiments. For example, there are provided in FIGS. 5 and 6 photos of the cross section of samples of 52100 steel which have been annealed at 950° C. for twenty minutes, then cooled to 740° C. and held at that temperature for five minutes, and followed by a quench to room temperature. The FIG. 5 sample was not exposed to any magnetic field during treatment, but the FIG. 6 sample was exposed to a magnetic field during treatment and, in particular, to a magnetic field which was ramped to 30 Tesla at the outset of the stage of treatment at which the sample was maintained at 740° C. The magnetic field strength was thereafter maintained at the 30 Tesla level for the duration of the experiment.

Figure 5:
FIG. 5 is a light micrograph photo illustrating the microstructure of a sample workpiece following thermal treatment which did not involve exposure of the sample to a high magnetic field.
Figure 6:
FIG. 6 is a light micrograph photo illustrating the microstructure of a sample workpiece following thermal treatment which also involved exposure of the sample to a high magnetic field.

The FIG. 5 and FIG. 6 photos are light micrographs of the microstructure taken at about the mid-length of the longitudinal plane for each corresponding sample. It can be observed from the FIG. 5 photograph (by one skilled in the art) that within the workpiece sample which was not exposed to a magnetic field during the treatment thereof, some cementite formed along prior austenite grain boundaries during the isothermal hold. However, the bulk of the microstructure of the FIG. 5 sample remained austenitic and transformed to martensite during the subsequent quench to room temperature. In contrast and as can be observed from the FIG. 6 photograph that within the workpiece which was exposed to the magnetic field during the treatment thereof, the austenite transformed to pearlite during the isothermal hold. It therefore follows that the exposure of the workpiece to the magnetic field during the treatment thereof altered the characteristics of the workpiece in that the magnetic field accelerated austenite decomposition.

It will be understood that numerous modifications and substitutions can be had to the aforedescribed embodiments without departing from the spirit of the invention. For example, although the aforedescribed embodiments have been shown and described as involving heat-treatment steps which are carried out with induction heating equipment, such heat-treatment steps can be carried out by any of a number of alternative heating means and methods. For example, a workpiece can be heated by its exposure to heated gas, resistance heating elements or even heated liquids (e.g. oil) or solids (e.g. metal salts). The choice of workpiece heating (and cooling) mediums can be selected, for example, based upon the rate at which heat is conducted from (or to) the workpiece to the medium.

Further still, although the heat-treating of workpieces with the aforedescribed embodiments have been described as involving a raising of the workpiece temperatures to an elevated level or maintaining the workpiece temperatures at the elevated level (i.e. isothermal holds at an elevated temperature), heat-treating can involve any of a number of techniques for effecting the temperature of the workpiece. For example, the heat-treating of a workpiece can involve a down-quenching of the workpiece from an elevated temperature to an intermediate temperature and holding the workpiece at the intermediate temperature; or the heat-treating can alter the workpiece temperature along any thermal transient path that can even include cryogenic temperature excursions.

Yet still further, although the apparatus 20 of FIG. 1 has been described above as including a non-magnetic guide tube 40, it may be desirable, in some instances, that the guide tube be comprised of a dielectric material. In any event, the guide tube needs to be capable of withstanding the working temperatures to which the workpiece would be exposed, which, for some workpieces, could exceed 1000 degrees Celsius.

As a further alternative, the guide tube could be utilized as a heatable susceptor which is capable of transferring heat which has been generated within the guide tube to the workpiece in order to heat the workpiece. For example, by positioning the workpiece within so as to contact the walls of the guide tube and thereafter utilize induction heating means to heat the guide tube, heat which is generated within the guide tube is conducted to the workpiece so that the workpiece is heated indirectly, rather than directly, by the induction heating means. In this latter example in which the guide tube can be heated by induction heating means, the guide tube can be constructed of materials which are easily heated by induction, such as austenitic stainless steels and carbon or other materials which possess a high resistivity.

Furthermore, although the aforedescribed embodiments have been shown and described as involving cooling steps which involve a cooling gas, such as argon or helium, such cooling steps can be carried out by any of a number of alternative cooling means and methods. For example, alternative cooling fluids, such as steam (also a gas), water (a liquid) or sand (a solid) can be directed into contact with the workpiece for cooling purposes. The selection and temperature of the medium with which a workpiece is cooled may be selected based upon the rate at which the workpiece is desired to be cooled.

Accordingly, the aforedescribed embodiments are intended for the purpose of illustration and not as limitation.

The invention claimed is:

1. A process for altering characteristics of a workpiece which includes an electrically-conductive material, the process comprising the steps of:
   providing a workpiece comprising an electrically conductive material within a bore of a magnet;
   providing, between the workpiece and the magnet, a means for thermally treating the workpiece;
   exposing the workpiece to an ultrahigh magnetic field of at least one Telsa generated by the magnet; and
   thermally treating the workpiece by the means in conjunction with the exposure of the workpiece to the magnetic field so that the characteristics of the workpiece are affected by both the ultrahigh magnetic field and the thermal treatment.

2. The process as defined in claim 1 wherein the step of thermally treating includes a step of heating the workpiece.

3. The process as defined in claim 2 wherein the step of heating is carried out with induction heating techniques.

4. The process as defined in claim 1 wherein the step of thermally treating includes a step of cooling the workpiece.

5. The process as defined in claim 4 wherein the step of cooling includes a step of introducing a cooling medium into contact with the workpiece.

6. The process as defined in claim 5 wherein the step of introducing includes a step of directing a cooling fluid across the workpiece.

7. The process as defined in claim 6 wherein the cooling fluid directed across the workpiece is one of a gas from a group of gases consisting of argon and helium.

8. The process as defined in claim 1 wherein the step of thermally treating includes:
   a step of heating the workpiece; and
   a step of cooling the workpiece.

9. The process as defined in claim 8 wherein the step of heating the workpiece and the step of cooling the workpiece are coordinated with one another to impart preselected characteristics to the workpiece.

10. The process as defined in claim 1 wherein the bore of the magnet defines a passageway, and further comprising moving the workpiece through the passageway during the exposure to the ultrahigh magnetic field.

11. The process as defined in claim 1 wherein the ultrahigh magnetic field is at least as high as 1 Tesla.

12. The process as defined in claim 11 wherein the ultrahigh magnetic field is as high as several tens of Tesla.

13. A process for altering characteristics of a workpiece, the process comprising:
   disposing a workpiece comprising an electrically conductive material within a bore of a magnet;
   providing a heating medium adjacent to the workpiece;
   thermally treating the workpiece;
   exposing the workpiece to an ultrahigh magnetic field of at least 1 Tesla generated by the magnet during the thermal treatment so as to alter characteristics of the workpiece by both the ultrahigh magnetic field and the thermal treatment.

14. The process of claim 13 wherein the heating medium is selected from the group consisting of: an induction heating coil, resistance heating elements, a heated gas, a heated liquid, and a heated metal salt.

15. The process of claim 13 wherein thermally treating the workpiece comprises heating the workpiece using the heating medium and cooling the workpiece by contacting the workpiece with a cooling fluid.

16. The process of claim 15 wherein the cooling occurs after the exposure to the ultrahigh magnetic field.

17. The process of claim 13 wherein the bore of the magnet defines a passageway, and further comprising moving the workpiece through the passageway during the exposure to the ultrahigh magnetic field.

18. The process of claim 13 wherein the magnet comprises an annular core, and the heating medium is disposed between the workpiece and the magnet.

19. The process of claim 13 wherein the bore of the magnet has an open end.

20. The process of claim 13 wherein the magnet comprises a superconductor.

* * * * *